(12) United States Patent
Rauscher et al.

(10) Patent No.: US 7,125,937 B2
(45) Date of Patent: Oct. 24, 2006

(54) POLYORGANOSILSESQUIOXANE SUPPORTED METALLOCENE CATALYSTS

(75) Inventors: David John Rauscher, Angleton, TX (US); William John Gauthier, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/765,688

(22) Filed: Jan. 27, 2004

(65) Prior Publication Data

US 2006/0154809 A1 Jul. 13, 2006

(51) Int. Cl.
C08F 4/16 (2006.01)
C08F 4/52 (2006.01)
C08F 4/76 (2006.01)
B01J 31/38 (2006.01)
B01J 31/34 (2006.01)

(52) U.S. Cl. ............... 526/130; 526/129; 526/160; 526/170; 526/351; 526/348.6; 526/943; 526/941; 502/118; 502/103

(58) Field of Classification Search .......... 502/103, 502/118; 526/160, 170, 943, 941, 130, 129, 526/351, 348.6
See application file for complete search history.

(56) References Cited

U.S. PATENT DOCUMENTS 6,087,513 A * 7/2000 Liao et al. .............. 549/524
6,441,210 B1 * 8/2002 Van Tol et al. .............. 556/9
6,723,806 B1 * 4/2004 Van Tol et al. ............ 526/113

FOREIGN PATENT DOCUMENTS

DE 197 30 376 A1 * 1/1999

OTHER PUBLICATIONS

Severn et al. Organometallics, 2000, 21, 4-6.*
Duchateau et al. Organometallics, 1998, 17, 5222-5224.*
Skowronska-Ptasinska et al. Organometallics, 2001, 20, 3519-3530.*
Wada et al. Organometallics, 2004, 23, 5824-5832.*

* cited by examiner

Primary Examiner—David W. Wu
Assistant Examiner—Rip A. Lee
(74) Attorney, Agent, or Firm—William D. Jackson

(57) ABSTRACT

Supported stereospecific catalysts and processes for the stereotactic propagation of a polymer chain derived from ethylenically unsaturated monomers such as the polymerization of propylene to produce syndiotactic polypropylene or isotactic polypropylene. The supported catalyst comprises a stereospecific metallocene catalyst component and a co-catalyst component comprising an alkylalumoxane. Both the metallocene catalyst component and the co-catalyst component are supported on a particulate polyorganosilsesquioxane support comprising spheroidal particles of a polyorganosilsesquioxane having an average. diameter with the range of 0.3–20 microns. The polyorganosilsesquioxane support is characterized by relatively low surface area, specifically a surface area less than 100 square meters per gram. The metallocene component can take the form of a single metallocene or two or more metallocenes which are co-supported on the polyorganosilsesquioxane support.

31 Claims, No Drawings

POLYORGANOSILSESQUIOXANE SUPPORTED METALLOCENE CATALYSTS

FIELD OF THE INVENTION

This invention relates to supported stereospecific metallocene catalysts supported on spheroidal siloxane support particles and their preparation and use in the production of stereospecific polymers from ethylenically unsaturated compounds.

BACKGROUND OF THE INVENTION

Stereospecific metallocenes can be characterized generally as coordination compounds incorporating cyclopentadienyl groups or derivatives thereof (which may be substituted or unsubstituted) coordinated with a transition metal. Various types of metallocenes are known in the art. They include bicyclic coordination compounds of the general formula:

$$(Cp)_2 MeQ_n \qquad (1)$$

characterized by the isospecific metallocenes as described below and cyclopentadienyl fluorenyl compounds of the general formula:

$$CpCp'MeQ_n \qquad (2)$$

characterized by the syndiospecific metallocenes as described below. In the aforementioned formulas the Me denotes a transition metal and Cp and Cp' each denote a cyclopentadienyl group which can be either substituted or unsubstituted with Cp' being different from Cp, Q is an alkyl or other hydrocarbyl or a halo group and n is a number within the range of 1–3. The cyclopentadienyl groups are in a stereorigid relationship normally provided by a bridged structure between the metallocene groups (not shown in Formulas (1) and (2) above) although stereorigidity can be provided through substituent groups which result in steric hindrance, as described, for example, in U.S. Pat. No. 5,243,002 to Razavi.

Isospecific and syndiospecific metallocene catalysts are useful in the stereospecific polymerization of monomers. Stereospecific structural relationships of syndiotacticity and isotacticity may be involved in the formation of stereoregular polymers from various monomers. Stereospecific propagation may be applied in the polymerization of ethylenically unsaturated monomers such as $C_{3+}$ alpha olefins such as propylene, 1-butene, 4-methyl-1-pentene, 1-dienes such as 1,3-butadiene, substituted vinyl compounds such as vinyl aromatics, e.g., styrene or vinyl toluene, vinyl chloride, vinyl ethers such as alkyl vinyl ethers, e.g., isobutyl vinyl ether, or even aryl vinyl ethers. Stereospecific polymer propagation is of most significance in the production of isotactic or syndiotactic polypropylene and polybutene.

The structure of isotactic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fischer projection formula, the stereochemical sequence of isotactic polypropylene is described as follows:

(3)

In FIG. 3 each vertical segment indicates a methyl group on the same side of the polymer backbone. Another way of describing the structure is through the use of NMR. Bovey's NMR nomenclature for an isotactic pentad as shown above is . . . mmmm . . . with each "m" representing a "meso" dyad, or successive pairs of methyl groups on the same said of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene using the Fisher projection formula can be indicated by racemic dyads with the syndiotactic pentad rrrr shown as follows:

(4)

Here, the vertical segments again indicate methyl groups in the case of syndiotactic polypropylene, or other terminal groups, e.g. chloride, in the case of syndiotactic polyvinyl chloride, or phenyl groups in the case of syndiotactic polystyrene.

Syndiotactic polymers are semi-crystalline and, like the isotactic polymers, are largely insoluble in cold xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

SUMMARY OF THE INVENTION

In accordance with the present invention, there are provided supported, stereospecific catalysts and processes for the stereotactic propagation of a polymer chain derived from ethylenically unsaturated monomers which contain three or more carbon atoms or which are substituted vinyl compounds, such as styrene and vinyl chloride. The preferred application of the present invention is in the stereospecific propagation of $C_3$–$C_4$ alpha olefins, particularly the polymerization of propylene to produce syndiotactic polypropylene. Another application of the present invention involves isospecific metallocene catalysts and their use in the polymerization of propylene to produce isotactic polymers, including homopolymers and copolymers, specifically, isospecific ethylene propylene copolymers. In carrying out the present invention, there is provided a supported metallocene catalyst comprising a stereospecific metallocene catalyst component and a co-catalyst component comprising an alkylalumoxane. The metallocene catalyst component incorporates a metallocene ligand structure having two sterically dissimilar cyclopentadienyl ring structures coordinated with the central transition metal atom. At least one of the cyclopentadienyl ring structures is a substituted cyclopentadienyl group which provides an orientation with respect to the transition metal atom which is sterically different from the orientation of the other cyclopentadienyl group. Both of the cyclopentadienyl groups are in a relationship with one another by virtue of bridge or substituent groups, which provide a stereorigid relationship relative to the coordinating transition metal atom to prevent rotation of said ring structures. Both the metallocene catalyst component and the co-catalyst component are at least partially supported on a particulate organosiloxane support comprising spheroidal particles of a polyorganosilsesquioxane having an average diameter within the range of 0.3–20 microns, preferably 5–15 microns. This supported catalyst is contacted in a polymerization reaction zone with an ethylenically unsaturated monomer which contains 3 or more carbon atoms or which is a substituted vinyl compound under polymerization conditions to produce stereospecific polymerization of the monomer.

The metallocene component can take the form of a single metallocene or can involve two or more metallocenes which are co-supported on the polyorganosilsesquioxane. support. Such catalyst components incorporating two or more metallocenes can be employed to produce, for instance, syndiotactic or isotactic polymers having broad molecular weight distributions.

In a preferred embodiment of the invention, the supported metallocene catalyst incorporates a particulate polyorganosilsesquioxane support of a generally spheroidal configuration having an average diameter as described previously. The spheroidal polyorganosilsesquioxane incorporates an alkyl aluminum disposed at least partially on the outer particle surfaces. A stereospecific metallocene is supported on the polyorganosilsesquioxane support particles. In one application of the invention, the metallocene is an unbalanced metallocene having a ligand structure in which stereorigidity is imparted by means of a structural bridge extending between dissimilar cyclopentadienyl groups. The metallocene is preferentially supported on the outer surfaces of the polyorganosilsesquioxane particles to provide a predominance of the supported polymerization sites provided by the transitional metal atom on the exterior of the support particles. The polyorganosilsesquioxane support is characterized by relatively low surface area. Preferably, the polyorganosilsesquioxane support has a surface area which is less than 100 square meters per gram (100 m$^2$/g).

In a further aspect of the invention there is provided a process for the preparation of a supported metallocene catalyst. In carrying out this aspect of the invention, there is provided a particulate catalyst support material in the form of spheroidal polyorganosilsesquioxane particles having an average diameter within the range of 0.3–20 microns, preferably 5–15 microns. The polyorganosilsesquioxane support material is contacted with an alumoxane co-catalyst in an aromatic hydrocarbon solution under conditions in which the alumoxane and the polyorganosilsesquioxane react with a portion of the alumoxane being retained on the polyorganosilsesquioxane support. The alumoxane containing polyorganosilsesquioxane support particles are recovered from the aromatic hydrocarbon solvent. A stereospecific metallocene incorporating a metallocene ligand structure having sterically dissimilar cyclopentadienyl ring structures coordinated with the central transition metal atom as described above is dispersed within an aromatic hydrocarbon solvent, or, alternatively, in an aliphatic hydrocarbon such as hexane where sufficient hexane solubility is present. The metallocene solvent dispersion and the product produced by the reaction of the polyorganosilsesquioxane support material and the alumoxane are mixed together for a period of time sufficient to allow the metallocene to become reactively supported on the polyorganosilsesquioxane support to form a supported metallocene catalyst. This supported catalyst is then recovered from the aromatic solvent.

In a specific embodiment of the invention, the metallocene is characterized by the formula:

$$R''(Cp_aR_n)(Cp_bR'_m)MeQ_p \qquad (5)$$

In formula (5), $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each R' is the same or different and is a hydrbcarbyl radical having 1–20 carbon atoms; R'' is a structural bridge between the cyclopentadienyl rings imparting stereorigidity to the catalyst and is selected from the group consisting of an alkylene radical having 1–4 carbon atoms or a substituted alkylene group such as a diphenyl methylene group, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical: Me is a group 4b, 5b, or 6b metal from the Periodic Table of Elements and each Q is a hydrocarbyl radical having 1–20 carbon atoms or is a halogen: p is from 0 to 3, m is from 0 to 3, n is from 1 to 4; and R'm is selected such that $(Cp_bR'_m)$ is a sterically different ring than $(Cp_aR_n)$. Preferably, $(Cp_aR_n)$ is a substituted or unsubstituted fluorenyl group having bilateral symmetry, Me is a titanium, zirconium, hafnium, or vanadium atom and the bridge R'' is a methylene, ethylene, organosilyl, substituted methylene, propylidene, diphenyl methylene, or substituted ethylene radical. More preferably the metallocene ligand is configured so that $(Cp_aR_n)$ forms a fluorenyl group or substituted fluorenyl radical having bilateral symmetry and $(Cp_bR'_m)$ forms an alkyl substituted or unsubstituted cyclopentadienyl radical having bilateral symmetry. More specifically the metallocene ligand $R''(Cp_aR_n)(Cp_bR'_m)$ is an isopropylidene (cyclopentadienyl-1-fluorenyl) or diphenyl methylene (cyclopentadienyl-1-fluorenyl) ligand structure. Another embodiment of the invention involves polyorganosilsesquioxane-supported metallocenes which are isospecific. Such metallocenes include bridged bis-indenyl metallocenes and substituted cyclopentadienyl fluorenyl metallocenes which produce isotactic polypropylene.

DETAILED DESCRIPTION OF THE INVENTION

The present invention involves processes for the preparation and use of supported stereospecific metallocenes which are effective in stereospecific polymer propagation, especially syndiotactic polymer propagation. Metallocene catalysts are often supported on various high surface area inorganic supports. Typically such supports have surface areas in excess of 100 m$^2$/g. Silica and magnesium chloride are common supports although other supports such as alumina and various clay minerals may be used. The present invention departs from the conventional procedure of employing high surface area inorganic supports such as silica, and provides for the incorporation of a stereospecific metallocene catalyst on a siloxane support of well-controlled and relatively narrow particle size.

As noted previously, the organosiloxane support is a fine well-defined powder having an average particle size within the range of 0.3–20 microns with a preferred average particle size within the range of 5–15 microns. The surface area is less than 100 m²/g, and normally less than about 85 m²/g, ranging down to 18 m²g for 0.3 micron particles. The organosiloxane particles are in a general sense of a spheroidal nature as contrasted with the angular granules of silica or other inorganics of a highly irregular shape sometimes used as catalyst supports or carriers. They may be nearly perfect spheres such as the polymethylsilsesquioxane particles disclosed in U.S. Pat. No. 5,149,748 to Shimsu et al., the entire disclosure of which is incorporated herein by reference. Prior to contacting the organosiloxane support with the stereospecific metallocene, the support is treated with an alumoxane co-catalyst. Alumoxane co-catalysts are also referred to as aluminoxane or poly hydrocarbyl aluminum oxides. Such compounds include oligomeric or polymeric compounds having repeating units of the formula:

  (6)

where R is an alkyl group generally having 1 to 5 carbon atoms. Alumoxanes are well known in the art and are generally prepared by reacting an organo aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms, whereby the aluminum carries a substituent, preferably an alkyl group. The exact structure of linear and cyclic alumoxanes is not known but is generally believed to be represented by the general formulae —(Al(R)—O—)-m for a cyclic alumoxane, and $R_2Al-O-(Al(R)-O)m-AlR_2$ for a linear compound wherein R independently each occurrence is a $C_1$–$C_{10}$ hydrocarbyl, preferably alkyl or halide and m is an integer ranging from 1 to about 50, preferably at least about 4. Alumoxanes also exist in the configuration of cage or cluster compounds. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes. Preferred alumoxanes are methylalumoxane and methylalumoxane modified with minor amounts of other higher alkyl groups such as isobutyl. Alumoxanes generally contain minor to substantial amounts of starting aluminum alkyl compounds. The preferred co-catalyst, prepared either from trimethylaluminum or triethylaluminum, is sometimes referred to as poly (methyl aluminum oxide) and poly (ethyl aluminum oxide), respectively. The alumoxane co-catalyst is at least partially located on: the surface of the organosiloxane support particles with a reaction that produces a free trialkyl aluminum that functions as a scavenger as described below. The orientation of the alumoxane on the surface of the support particles, together with the generated trialkyl aluminum, fnctions to activate the subsequently added metallocene.

In carrying out the polymerization reaction the normal practice is to employ a scavenging agent or polymerization co-catalyst which is added to the polymerization reactor along with the supported metallocene. These scavengers can be generally characterized as organo metallic compounds of metals of Groups IA, IIA, and IIIB of the Periodic Table of Elements. As a practical matter, organo aluminum compounds are normally used as co-catalysts in polymerization reactions. Specific examples include triethyl aluminum, tri-isobutyl aluminum, diethyl aluminum chloride, diethyl aluminum hydride and the like. Scavenging co-catalysts normally employed in the invention include triethyl aluminum (TEAL) and tri-isobutyl aluminum (TIBAL). Tri-isobutyl aluminum can also be employed as a dispersant in which the supported catalyst is aged for a suitable period of time of from one minute to several days prior to use in the polymerization reaction as described in U.S. Pat. No. 6,239,058 to Shamshoum et al., the entire disclosure of which is incorporated herein by reference.

Metallocene catalysts that produce isotactic polyolefins are disclosed in U.S. Pat. Nos. 4,794,096 and 4,975,403 to Ewen. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

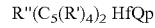  (7)

In formula (7), $(C_5(R')_4)$ is a cyclopentadienyl or substituted cyclopentadienyl group, R' is independently hydrogen or a hydrocarbyl radical having, 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in U.S. Pat. No. 4,892,851 to Ewen. These catalysts are also bridged stereorigid metallocene catalysts, but, in this case, the catalysts have a structural bridge extending between dissimilar cyclopentadienyl groups and may be characterized by the formula:

  (8)

In formula (8), Cp represents a cyclopentadienyl or substituted cyclopentadienyl ring, and R and R' represent hydrocarbyl radicals having 1–20 carbon atoms. R" is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring that $(CpR_n)$. In formula (8) n varies from 0–4 (0 designating no hydrocarbyl groups, i.e., an unsubstituted cyclopentadienyl ring), m varies from 1–4, and k is from 0–3. The sterically different cyclopentadienyl rings are configured in the ligand structure to produce a predominantly syndiotactic polymer rather than an isotactic polymer.

Specifically disclosed in U.S. Pat. No. 4,892,851 to Ewen, are bridged metallocene ligands having a dissimilar cyclopentadienyl group resulting from the reaction of 6, 6 dimethyl fulvene with a substituted cyclopentadiene, fluorene, to produce a ligand characterized by an isopropylidene bridge structure. Preferably, this ligand structure is characterized as having bilateral symmetry such as indicated by the isopropylidene (cyclopentadienyl fluorenyl) structure as shown below:

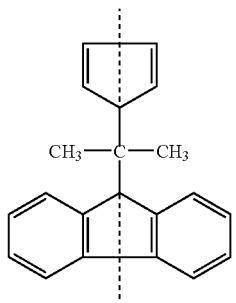

(9)

As indicated by Formula (9), the bilateral symmetry of the ligand structure is indicated by the balanced orientation about the broken line representing a plane of symmetry extending generally through the bridge structure and the transition metal atom.

While stereorigidity is normally established by a structural bridge as described above, an alternative approach is described in U.S. Pat. No. 5,243,002 to Razavi. This patent discloses the establishment of a stereorigid relationship imparted by a sterically-hindered relationship between substituted cyclopentadienyl rings which prevent rotation of the ring structures about their coordination axis. Alternatively, the cyclopentadienyl groups may be highly substituted such that a relatively low kinetic energy state is induced by the substituents in order to prevent rotation rings about their coordination axis at the temperature of the catalyst.

Catalyst systems useful in the formation of isotactic poly lefins include the racemic bis-indenyl compounds of the type disclosed in U.S. Pat. No. 4,794,096 to Ewen. The bis (indenyl) ligand structures may be unsubstituted or they may be substituted as described below. Other isospecific metallocenes useful in carrying out the invention are based upon cyclopentadienyl fluorenyl ligand configurations which are substituted to provide a lack of bilateral symmetry. Catalysts of this nature are disclosed in U.S. Pat. No. 5,416,228 to Ewen et al. Here, the ligand structure is configured so that one cyclopentadienyl group of a bridged ligand has a bulky group on one and only one of the distal positions of a cyclopentadienyl ring. Typical of such metallocenes is isopropylidene (3-tertiary butyl cyclopentadienyl fluorenyl) zirconium dichloride.

Other isospecific metallocenes based on cyclopentadienyl fluorenyl ligand structures are disclosed in EPO 0881,236A1 to Razavi. Here, the ligand structures are characterized by bridged cyclopentadienyl and fluorenyl groups in which the cyclopentadienyl group is substituted at both proximal and distal positions. The distal substituent is preferably a bulky group such as a tertiary butyl group, and the proximal substituent is a less bulky group such as a methyl group which may be either vicinal or non-vicinal to the distal substituent. The fluorenyl group may be substituted or unsubstituted with up to eight substituent groups but preferably are unsubstituted at the positions which are distal to the bridgehead carbon atom. Specifically disclosed in EPO 881,236A1 are isopropylidene(3-tertiary butyl, 5-methyl cyclopentadienyl fluorenyl) zirconium dichloride and isopropylidene(3-tertiary butyl, 2-methyl cyclopentadienyl fluorenyl) zirconium dichloride.

Yet other isospecific metallocenes based upon bis(fluorenyl) ligand structures are disclosed in U.S. Pat. No. 5,945, 365 to Reddy. Here, the ligand structure is characterized by two bridged fluorenyl groups with 1 or 2 substituents at distal positions on each fluorenyl group with one group of substituents being located transversely from the other with respect to a plane of bilateral symmetry extending through the bridge group. Preferred ligand structures are bridged bisfluorenyl ligands substituted at the 4,4' positions by methyl, methoxy, isopropyl or tertiary butyl groups. For a further description of isospecific metallocenes, reference is made to the aforementioned U.S. Pat. Nos. 4,794,096, 5,416,228 and 5,945,365 and EPO 881,236A1, the entire disclosures of which are incorporated herein by reference.

In experimental work respecting the present invention, a syndiospecific metallocene catalyst was supported on a crosslinked polymethylsilsesesquioxane support having an average particle size of 12 microns. The particles are available from Toshiba Silicone, Inc. under the designation Tospearl 3120. The polymethylsilsesquioxane particles and similar polyorganosiloxane spherical particles can be produced by procedures as disclosed in U.S. Pat. No. 5,415,912 to Yashitaka et al., the entire disclosure of which is incorporated herein by reference. The support particles are characterized by a bulk density of about 0.2 to 0.5 grams per cubic centimeter. The particles are characterized as spheroidal, since they are spheres which are perfect, or if not perfect, they conform closely to a spherical shape. The characteristic spheroidal shape of the organosiloxane particles employed in the present invention is illustrated in the aforementioned U.S. Pat. No. 5,149,748.

In forming the supported catalyst component, the support particles normally are contacted first with alumoxane followed by the metallocene. The reaction involved in treating a polyorganosilsesquioxane support with an alumoxane co-catalyst differs from that involved in the application of alumoxane to a silica support. A silica support has silanol functional groups (SiOH) which can react with an alumoxane such as methylalumoxane to anchor some portion of the methylalumoxane to the silica support. This reaction can be characterized as follows:

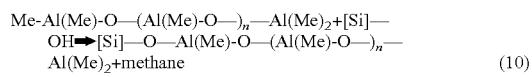

(10)

The polyorganosilsesquioxane support employed in the present invention is characterized by a crosslinked structure in which the siloxane bond extends three dimensionally, as disclosed, for example, in U.S. Pat. No. 5,085,534 to Kenichi et al. For the polymethylsilsesquioxane support as exemplified by Tospearl 3120 referred to above, the support can be characterized by the following structural formula:

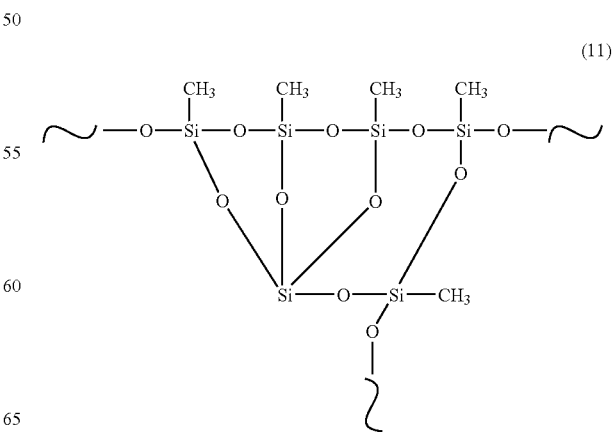

(11)

As indicated by the formula 11, the polymethylsilsesquioxane support has methyl fínctional groups (Si—CH3) which can react with MAO and thus be involved in anchoring some portion of the MAO to the siloxane support. However, this reaction is different than the reaction 10 involving OH groups and other reactions, such as an exchange of alkyl and oxygen atoms can result as indicated by the following reaction:

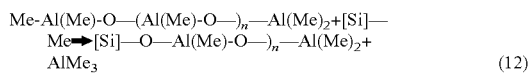

(12)

The experimental work with the siloxane supports was carried out employing a syndiospecific metallocene, diphenyl methylene (cyclopentadienyl) (fluorenyl) zirconium dichloride. In preparing the alkylsiloxane supported metallocene catalysts, the siloxane support particles were dried under a nitrogen stream for 14 hours at 50° C. The support was then employed in a dispersion formed of 10 grams of the polymethylsilsesquioxane support particles and 80 milliliters of toluene. After the siloxane dispersion was stirred to disperse the siloxane particles within the toluene carrier, methylalumoxane (MAO) was added in an amount to provide a weight ratio of MAO to siloxane of 0.7:1. The methylalumoxane, 23.6 grams of MAO solution (30 wt. % in toluene), was added slowly to the polymethylsilsesquioxane dispersion. The two components were mixed at room temperature briefly. Thereafter the mixture was refluxed at 130° C. for about 4 hours and then allowed to cool to ambient temperature. The supernatant toluene was decanted and the residual solids were washed three times with 100 milliliters of toluene. The supernatant solution reacted vigorously with isopropanol, providing an indicating that a large amount of the MAO was not supported but remained in the toluene solution. Most of the MAO, accordingly, was not fixed on the siloxane support particles. Following decantation of the last toluene wash, the solid MAO polymethylsilsesquioxane particles were dispersed in 100 milliliters of hexane and left overnight. The hexane layer was then decanted and the solids were washed two times with 100 milliliter portions of hexane and then dried under a vacuum for two hours. The MAO-supported polymethylsilsesquioxane particles were then recovered as a fine white powder.

In order to support the metallocene on the polymethylsilsesquioxane particles, metallocene loading was accomplished by providing a dispersion of the stereospecific metallocene in toluene. The metallocene employed in the experimental work was the syndiospecific metallocene, diphenylmethylene cyclopentadienyl fluorenyl zirconium dichloride. A metallocene loading of a 2 wt. % on the MAO polymethylsilsesquioxane support was employed. By way of example of the metallocene loading procedure, about 4.9 grams of the MAO-reacted polymethylsilsesquioxane support were added to a round-bottomed flask along with 80 milliliters of toluene. The metallocene, in an amount of 101 milligrams, was added in 20 milliliters of toluene. The contents were added in a 40 milliliter Wheaton vial and the contents stirred for about 1 hour. The solids were washed on a frit sequentially with three 50 milliliter portions of toluene followed by three 50 milliliter portions of hexane. The final catalyst was dried in vacuum to give a powder having a slight purple color and weighing 4.825 grams. Mineral oil was then added to this solid to provide a total mineral oil dispersion of 50.195 grams containing about 9.61% solids.

The aforementioned syndiospecific catalyst on the polymethylsiisesquioxane support was used in a polymerization procedure carried out in a stirred autoclave-type reactor having a 4 liter capacity. Polymerizations were performed in liquid propylene. In the polymerization run, the reactor was charged with 723 grams of propylene and 97 mmoles of hydrogen. The supported catalyst in the amount of 36 mg was flushed into the reactor with triisobutyl aluminum in an amount of 108 mg in hexane, along with 610 grams of propylene at room temperature. The reactor temperature was increased rapidly to about 60° C. and the polymerization was allowed to proceed for about 1 hour. Residual propylene and hydrogen were then flashed from the reactor and the polymer fluff was recovered and allowed to dry in air overnight. The activity of the catalyst based upon the polypropylene recovered was 1,400 g/g/h and the bulk density of the resin was 0.21 g/cc³.

Having described specific embodiments of the present invention, it will be understood that modifications thereof may be suggested to those skilled in the art, and it is intended to cover all such modifications as fall within the scope of the appended claims.

The invention claimed is:

1. A process for the polymerization of an ethylenically unsaturated monomer comprising:
    a. providing a supported metallocene catalyst comprising a stereospecific metallocene catalyst component supported on a polyorganosilsesquioxane support comprising spheroidal polyorganosilsesquioxane support particles having an average particle size within the range of 0.3–20 microns and having an alkylalumoxane co-catalyst component supported on said polyorganosilsesquioxane support by reaction of said alkylalumoxane and said polyorganosilsesquioxane support; and
    b. contacting said catalyst in a polymerization reaction zone with an ethylenically unsaturated monomer which contains three or more carbon atoms, or which is a substituted vinyl compound and maintaining said reaction under polymerization conditions to produce polymerization of said monomer to produce a stereoregular polymer.

2. The process of claim 1 wherein said polyorganosilsesquioxane support particles have an average particle size within the range of 5–15 microns.

3. The process of claim 1 wherein the polyorganosilsesquioxane is a polyalkylorganosilsesquioxane wherein the alkyl groups that contain from 1–4 carbon atoms.

4. The method of claim 1 wherein said polyorganosilsesquioxane powder comprises polymethylsilsesquioxane and said alkylalumoxane co-catalyst component comprises methylalumoxane.

5. The process of claim 1 wherein said ethylenically unsaturated monomer is a $C_3$ or $C_4$ alpha olefin.

6. The process of claim 4 wherein said alpha olefin is propylene.

7. The process of claim 5 wherein said alkylalumoxane is at least partially supported on the outer surface of said polyorganosilsesquioxane support particles.

8. The process of claim 1 wherein said metallocene is characterized by the formula:

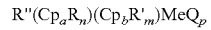

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each R' is the same or different and is a hydrocarbyl radical having 1–20 carbon atoms; R" is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; p is from 0 to 3, m is from 0 to 3, n is from 1 to 4; and wherein $R'_m$ is selected such that $(Cp_bR'm)$ is a sterically different ring than $(Cp_aR_n)$.

9. The process of claim 8 wherein R is selected such that $(Cp_aR_n)$ forms a substituted or unsubstituted fluorenyl group.

10. The process of claim 9 wherein Me is titanium, zirconium, hafnium, or vanadium.

11. The process of claim 10 wherein R" is a methylene, ethylene, organosilyl, substituted methylene, or substituted ethylene radical.

12. The process of claim 11 wherein $R''(CpR_n)(CpR'_m)$ forms an isopropylidene (cyclopentadienyl-1-fluorenyl) radical or a diphenylmethylene (cyclopentadienyl-1-fluorenyl) radical.

13. The process of claim 10 wherein R is selected such that $(Cp_aR_n)$ forms a substituted fluorenyl radical having bilateral symmetry and R' is selected such that $(Cp_bR_m)$ forms an alkyl substituted or unsubstituted cyclopentadienyl radical having bilateral symmetry.

14. The process of claim 1 wherein $R''(CpR_n)(CpR'_m)$ forms an isopropylidene (cyclopentadienyl-1-fluorenyl) radical or a diphenylmethylene (cyclopentadienyl-1-fluorenyl).

15. A process for the polymerization of an ethylenically unsaturated monomer comprising:
  a. providing a supported metallocene catalyst comprising a stereospecific metallocene catalyst component supported on a polyalkylsilsesquioxane support comprising spheroidal particles having an average particle size within the range of 0.3–20 microns and having an alkyl alumoxane cocatalyst component supported on said polyorganosilsesquioxane support by reaction of said alkyl alumoxane cocatalyst component with said support to produce an oxygen linkage of said alkyl alumoxane to said support with the attendant production of trialkylaluminum; and
  b. contacting said catalyst in a polymerization reaction zone with an ethylenically unsaturated monomer which contains three or more carbon atoms or which is a substituted vinyl compound and maintaining said reaction under polymerization conditions to produce polymerization of said monomer to produce a stereorigid polymer.

16. The method of claim 15 wherein said ethylenically unsaturated monomer is a $C_3$–$C_4$ alpha olefin.

17. The method of claim 16 wherein said alpha olefin is propylene.

18. The method of claim 15 wherein the polyalkylsilsesquioxane comprises polymethylsilsesquioxane and said alkyl alumoxane cocatalyst component comprises methylalumoxane.

19. The method of claim 18 wherein said supported metallocene catalyst includes trimethylaluminum.

20. A process for the preparation of a supported metallocene catalyst comprising:
  a. providing a particulate catalyst support material in the form of a polyorganosilsesquioxane powder having an average particle size within the range of 0.3–20 microns;
  b. contacting said particulate support material with an alumoxane cocatalyst;
  c. providing a dispersion in an aromatic hydrocarbon solvent of a stereospecific metallocene incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl ring structure with respect to said transition metal atom, and both of said cyclopentadienyl ring structure being in a relationship with each other providing a stereorigid relationship relative to said coordinating transition metal atom to prevent rotation of said ring structures;
  d. mixing said dispersion and the product produced by the reaction of said particulate catalyst support material and alumoxane co-catalyst for a period of time to allow said metallocene to become reactively supported on said particulate support support to form a supported catalyst;
  e. recovering said supported catalyst from said aromatic hydrocarbon solvent.

21. The process of claim 20 wherein the polyorganosilsesquioxane powder is a polyalkylorganosiloxane comprising alkyl groups that contain from 1–4 carbon atoms.

22. The method of claim 21 wherein said polyorganosilsesquioxane powder comprises polymethylsilsesquioxane and said alumoxane cocatalyst comprises methylalumoxane.

23. The method of claim 22 wherein steps (a) and (b) involve the production of trimethylaluminum.

24. A process for the preparation of a supported metallocene catalyst comprising:
  a. providing a particulate catalyst support material in the form of polyalkylsilsesquioxane powder having an average particle size within the range of 0.3–20 microns;
  b. contacting said particulate support material with an alkyl alumoxane cocatalyst to produce a reaction product of said polyalkylsilsesquioxane powder and said alkyl alumoxane cocatalyst and a trialkyl aluminum;
  c. providing a dispersion in an aromatic hydrocarbon solvent of a stereospecific metallocene incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl ring structure with respect to said transition metal atom, and both of said cyclopentiadienyl ring structure being in a relationship with each other providing a stereorigid, relationship relative to said coordinating transition metal atom to prevent rotation of said ring structures;
  d. mixing said dispersion and the reaction product produced by the reaction of said particulate catalyst support material and alkyl alumoxane cocatalyst for a period of time to allow said metallocene to become reactively supported on said particulate support support to form a supported catalyst; and
  e. recovering said supported catalyst froin said aromatic solvent.

25. The method of claim 24 wherein said polyalkylsilsesquioxane powder comprises polymethylsilsesquioxane and said alkylalumoxane cocatalyst comprises methylalumoxane.

26. The method of claim 25 wherein steps (a) and (b) involve the production of trimethylaluminum.

27. A supported metallocene catalyst composition comprising:
   a. a particulate support comprising spheroidal polyorganosilsesquioxane support particles having an average diameter within the range of 0.3–20 microns and having an alkylalumoxane co-catalyst supported on the surface of said polyorganosilsesquioxane support particles by reaction of said alkylalumoxane co-catalyst and said polyorganosilsesquioxane support; and
   b. a stereospecific metallocene supported on said particulate support and incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl ring structure with respect to said transition metal atom, both of said cyclopentadienyl ring structure being in a relationship with each other providing a stereorigid relationship relative to said coordinating transition metal atom to prevent rotation of said ring structures.

28. The composition of claim 27 wherein said polyorganosilsesquioxane support particles have an average surface area of less than 100 $m^2/g$.

29. The composition of claim 27 wherein said stereospecific metallocene comprises at least two stereospecific metallocenes.

30. The composition of claim 27 wherein said stereospecific metallocene comprises a syndiospecific metallocene.

31. The composition of claim 27 wherein said stereospecific metallocene comprises an isospecific metallocene.

* * * * *